United States Patent [19]

Birner et al.

[11] 4,104,875

[45] Aug. 8, 1978

[54] ION PRIME MOVER

[75] Inventors: Winfried Birner, Eichenkofen; Hans Mueller, Munich; Horst Listmann, Sauerlach; Helmut Bassner, Ottobrunn, all of Fed. Rep. of Germany

[73] Assignee: Messerschmitt-Boelkow-Blohm GmbH, Munich, Fed. Rep. of Germany

[21] Appl. No.: 754,092

[22] Filed: Dec. 23, 1976

[30] Foreign Application Priority Data

Jul. 28, 1976 [DE] Fed. Rep. of Germany ....... 2633778

[51] Int. Cl.[2] ........................ F02K 11/00; H05H 1/16

[52] U.S. Cl. ..................................... 60/202; 313/360; 313/362; 313/363; 313/161; 313/230

[58] Field of Search .................. 60/202; 313/360-363, 313/161, 230

[56] References Cited

U.S. PATENT DOCUMENTS

| | | | |
|---|---|---|---|
| 3,238,715 | 3/1966 | Reader et al. | 313/362 |
| 3,262,262 | 7/1966 | Reader et al. | 60/202 |
| 3,345,820 | 10/1967 | Dryden | 60/202 |
| 3,412,559 | 11/1968 | Sohl | 60/202 |
| 3,552,124 | 1/1971 | Banks et al. | 313/362 |

*Primary Examiner*—Robert E. Garrett
*Attorney, Agent, or Firm*—W. G. Fasse; W. W. Roberts

[57] ABSTRACT

An ion prime mover or engine includes an ionization chamber closed up by a plasma boundary anchor. A field winding surrounds the ionization chamber for producing a high frequency electromagnetic alternating field. Such field ionizes a gas in the ionization chamber. The ion engine further includes an anode-cathode path for producing an electrostatic field, wherein the ionized gas is accelerated out of the ionization chamber through the apertures in the plasma boundary anchor and in the cathode. The high frequency electromagnetic alternating field is arranged in such a manner that this field is substantially undisturbed in the area of the plasma boundary anchor and that the field lines extend substantially perpendicularly to the surface of the plasma boundary anchor facing the ionization chamber.

7 Claims, 3 Drawing Figures

ION PRIME MOVER

BACKGROUND OF THE INVENTION

The present invention relates to an ion prime mover or engine. Such engines or prime movers produce thrust by the utilization of the reaction drive principle. A so called reaction mass is ionized in an ionization chamber by electric energy and the positively charged ions are accelerated in an electrostatic field. The reaction or supporting mass is preferably mercury in the gaseous state. However, one of the rare gases may also be used, for example neon or xenon.

It is a special problem for the operation of an ion engine to produce the ions in an efficient manner. According to a known method for producing a plasma a high frequency electromagnetic alternating field is produced inside a chamber filled with the reaction or support mass. The ions produced in this manner are accelerated out of the ionization chamber by means of an electrostatic field which drives the ion through apertured electrodes. One ion engine of this type is known under the name "RIT" (Radiofrequency-Ion-Thruster). AIAA Paper No. 73-1146 describes such a "RIT" engine.

Investigations made in connection with one such ion engine have shown that the ion density available in the ionization chamber is too small in comparison to the energy required for producing the high frequency alternating field. In other words, the ionization is not efficient. Another drawback of the prior art device is seen in that at the rate thrust of the ion engine, extremely large current losses occur at the acceleration electrodes. Besides, the stable operation of the prior art ion engine is frequently disturbed by electrical arcing.

OBJECTS OF THE INVENTION

In view of the above, it is the aim of the invention to achieve the following objects singly or in combination:

to overcome the drawbacks of the prior art, more specifically to increase the efficiency of such ion engines and to increase their service reliability;

to construct an ion engine in such a manner that the ion production rate and the ion density of the plasma, especially in the area just ahead of the plasma boundary anchor is substantially increased;

to arrange the electrical acceleration field in such a manner that the field lines are undisturbed, especially in the vicinity of the plasma boundary anchor;

to avoid power losses by making certain that ions are not prevented from being accelerated out of the ionization chamber; and to increase the operational life of the apparatus, especially of the cathode.

SUMMARY OF THE INVENTION

According to the invention, there is provided an ion engine having an ionization chamber closed by a plasma boundary anchor and surrounded by a field winding for producing a high frequency electromagnetic alternating field, which ionizes a gas inside the ionization chamber. An anode-cathode path is provided in the chamber for producing an electrostatic field in which the ionized gas is accelerated out of the ionization chamber through openings in the plasma boundary anchor and in the cathode. The high frequency electromagnetic alternating field is arranged in such a manner that the field lines extend substantially undisturbed and perpendicularly relative to the surface of the plasma boundary anchor facing into the ionization chamber.

It has been found that an electrically conducting cathode of the acceleration system as it is used in the prior art, establishes a field which is opposed to the alternating field, whereby the alternating field required for the ionization is substantially disturbed. Such a disturbance influences the ionization rate, as well as the ion density of the plasma in the area of the plasma boundary anchor. Due to the good conductivity of the plasma the disturbance also makes the electrostatic acceleration field inhomogeneous in front of the plasma boundary anchor. The mentioned disturbances are especially disadvantageous in the area in front of the plasma boundary anchor, because the ion density, as well as the field strength and the path of the field lines in the area in front of the plasma boundary anchor determines the power rating of the ion engine. Thus, the thrust is reduced correspondingly in those locations of the acceleration system having a reduced ion density. Further, disturbances of the electrostatic acceleration field cause a reduction of the acceleration force on the one hand, and on the other hand they cause deviations of the ions from the acceleration direction. As a result, a larger proportion of the accelerated ions is prevented from passing through the apertures in the plasma boundary anchor and in the cathode, whereby these ions are deflected to impinge upon the walls of the ionization chamber, especially of the cathode. Such ion deflection not only results in a reduction in the power output of the ion engine, but the increased impinging of the ions on the cathode substantially reduces the operational life of the cathode.

The invention avoids the just outlined disadvantage by defining the paths of the field lines of the electromagnetic alternating field in such a manner that a deflection of the ions is avoided, especially in the area where they are intended to pass through the ion boundary anchor and the cathode. This is accomplished substantially by the combination of two interdependent features. These features include the selection of the materials, especially for the cathode and the arrangement of the elements relative to each other in such a manner that the effective conductivity of the cathode is reduced to such an extent that the high frequency alternating field can penetrate through the cathode, whereby any build-up of a counter-field is substantially prevented.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
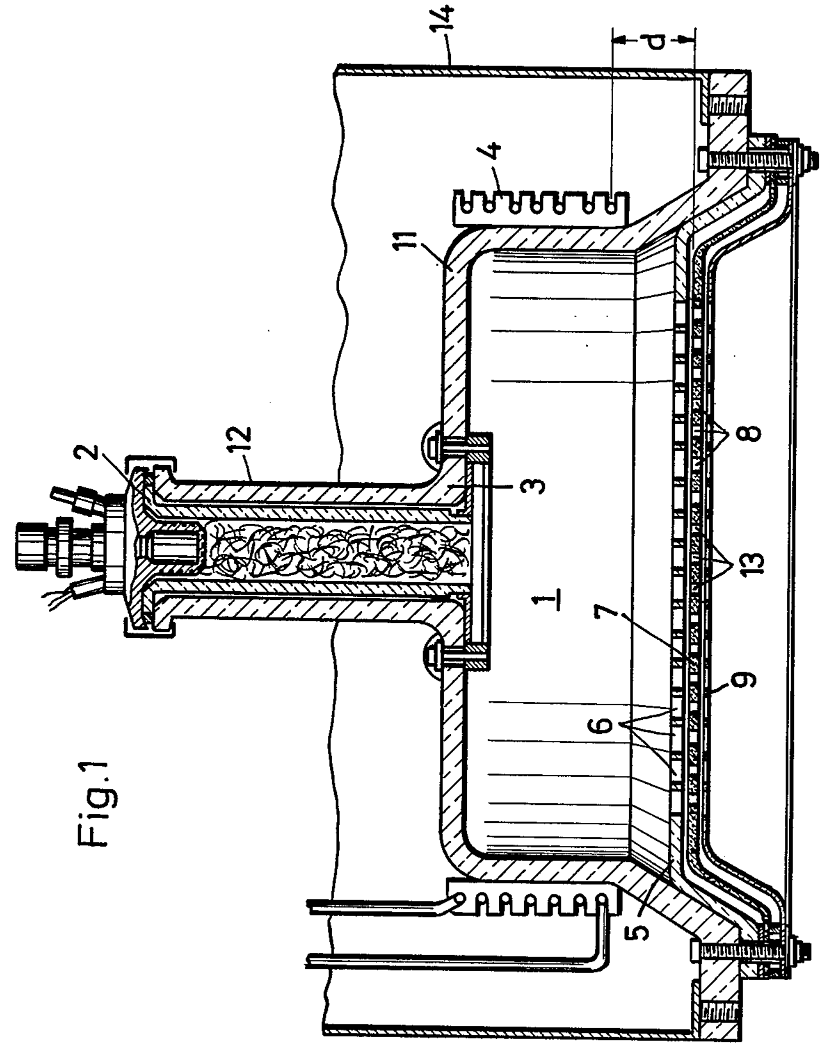
FIG. 1 is a sectional view through an example embodiment of an ion engine according to the invention.

FIG. 1 illustrates a sectional somewhat schematic view through an ion engine according to the invention. The ion engine comprises a substantially cylindrical ionization chamber 1 surrounded by a wall 11 made of an insulating material, such as quartz glass. The housing 11 is provided with an inlet port 12 having secured thereto a vaporizer 2. The reaction or ionization supporting mass, for example mercury, is vaporized in the vaporizer 2. The thus produced gas particles pass by or through an anode 3 into the ionization chamber proper. In this chamber the gas particles are exposed to the influence of a high frequency electromagnetic alternating field having a frequency of about 1 MHz produced by a field winding 4 concentrically surrounding the ionization chamber 1.

The field winding 4 is energized by a high frequency generator not shown. The high frequency alternating field quickly moves free electrons back and forth in the ionization chamber. The free electrons are introduced into the ionization chamber when the engine is started. The means for introducing the free electrons into the chamber are well known and hence not shown in FIG. 1. Due to the just mentioned rapid movement of the electrons they collide with the gas particles, whereby the latter are ionized. As a result, positively charged heavy gas particles or plasma and free electrons are produced. The electrodes travel to the anode where they are removed, for example, by suction means. A plasma boundary anchor 5 prevents the escape of the plasma from the ionization chamber. This anchor is arranged to close the ionization chamber opposite the anode, except for the apertures 6 in the anchor 5.

A cathode 7 having a plurality of apertures 8 is arranged in parallel to the plasma boundary anchor 5. A predetermined spacing is provided between the plasma boundary anchor 5 and the cathode 7. The cathode 7 is made for example of graphite having a specific resistance of more than $10\Omega mn^2/m$. An electrostatic acceleration field is effective between the anode 3 and the cathode 7. The plasma boundary anchor 5 is made of an insulator, for example quartz glass, and has a plurality of apertures 6 which extend coaxially with the apertures 8 in the cathode 7. The electrostatic field accelerates the plasma to pass through these apertures 6 and 8, whereby a counterforce referred to as thrust is generated. A further apertured electrode 9 is arranged in parallel to the cathode 7 opposite the side of the plasma boundary anchor 5. This further apertured electrode 9 somewhat decelerates, for reasons of the energy balance, the ions expelled through the apertures 8 of the cathode 7.

According to the invention, the field winding 4 for generating the high frequency ionization field does not extend all the way down to the cathode 7 but rather it ends at a determined spacing "*d*" above the cathode. This feature of the invention will be described below with reference to FIGS. 2 and 3.

Figure 2:
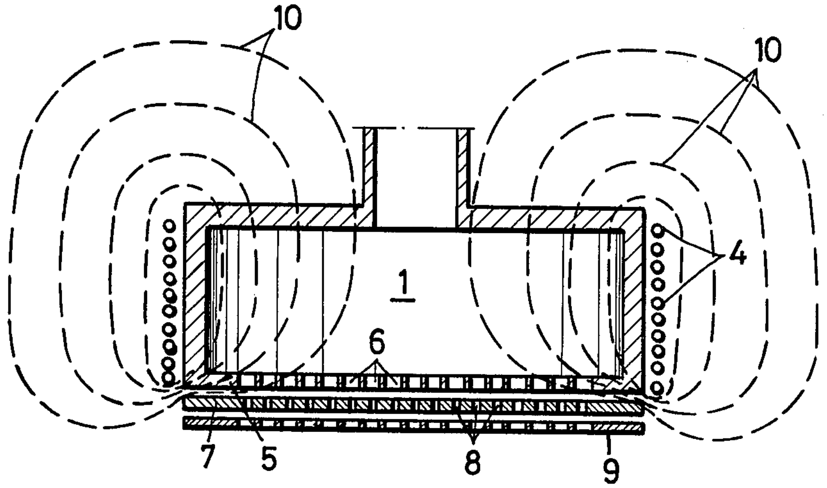
FIG. 2 is a sectional view through a conventional ion engine illustrating the paths of the electromagnetic field lines and their disturbance near the plasma boundary anchor and the cathode.

FIG. 2 illustrates a schematic sectional view through a prior art ion engine. Those skilled in the art assumed that it was necessary for the field winding 4 to extend over the entire length of the ionization chamber for producing a homogeneous ion density inside the ionization chamber 1. This assumption was based on the consideration that a homogeneous distribution of the field lines inside the discharge or ionization chamber would be achieved more easily by a larger length of the field winding 4. In order to avoid potential differences on the cathode, it was also customary heretofore to manufacture the cathode of a material having a good electrical conductivity. Thus, prior art cathodes were made of metal.

However, the above considerations did not take into account the influence which the cathode exerts on the distribution of the field lines of the alternating field. The resulting ion distribution in the area of the plasma boundary anchor was also not taken into consideration. However, such ion distribution is essential for the proper operation of the ion engine.

FIG. 2 illustrates the strongly disturbed field line distribution of the high frequency alternating field just ahead of the plasma boundary anchor 5. This distortion of the field lines results in an uneven ion distribution in this area as well as in disturbances of the electrical acceleration field. The result of these disturbances has been described above.

Figure 3:
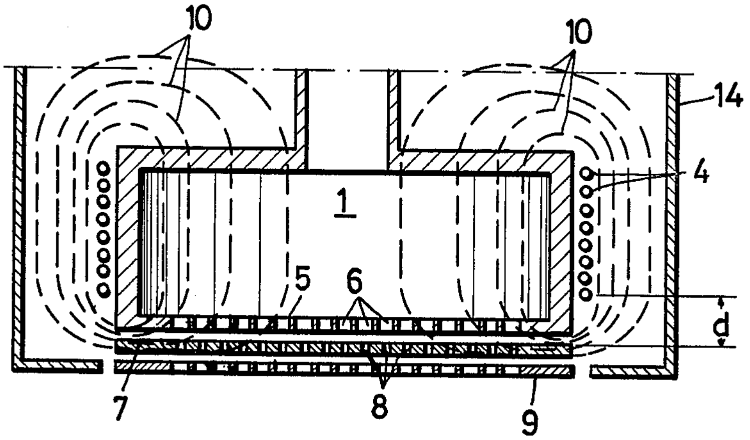
FIG. 3 is a sectional view through an ion engine according to the invention, wherein the paths of the electromagnetic field lines is undisturbed.

FIG. 3 illustrates the field line distribution in an ion engine constructed according to the invention. As compared with FIG. 2, it will be noted that in FIG. 3 the field lines are substantially undisturbed adjacent to the plasma boundary anchor 5. This is accomplished because the field winding 4 ends at a predetermined distance "*d*" ahead of the cathode 7, which is made of graphite having a relatively low electrical conductivity. Due to this combination of features it has been achieved according to the invention that the field lines of the alternating field correspond substantially to an undisturbed field line distribution. A completely undisturbed field line distribution is shown at the upper end of FIG. 3. A metallic housing 14 surrounds the field winding 4 in a concentric manner, which also contributes to the undisturbed field line distribution.

In connection with the low conductivity of the cathode 7, it will be appreciated, that the limit of the conductivity will be determined by the requirement that the potential differences between the exit apertures 8 in the cathode 7 remain sufficiently small so that they may be disregarded. In this context it has been found to be advantageous to select the electrical conductivity and permeability of the cathode in such a manner that the high frequency alternating field substantially penetrates the cathode. This may be accomplished if the cathode has a thickness corresponding to about the penetration depth "*s*" of the alternating electric field. This penetration depth may be calculated by the formula $$S = 1/(\pi f \mu_o \mu_r \kappa), \text{ absolute permeability,}$$

wherein $\pi = 3.14$, wherein $f$ = the frequency of the alternating field in Hz, wherein $\mu_o = 1.256$ [$\mu$H/m], which is the absolute permeability, wherein $\mu_r$ = relative permeability and wherein $\kappa$ = the specific conductivity of the cathode material in [S $m/mm^2$]. As mentioned, a cathode made of graphite has been found to be advantageous, whereby the cathode should have a thickness of, for example, 2 mm and a relative permeability of $\mu_r = 1$, as well as the above mentioned specific electrical resistance larger than 10 $\Omega mm^2/m$.

The influence of the cathode on the electromagnetic alternating field may be further reduced by producing the cathode of an insulating material and by providing the walls of the apertures 8 in the cathode 7 with a coating or lining of electrically conducting material, which coatings or linings 13 are interconnected with each other in an electrically conducting manner. This type of cathode structure thus comprises electrically conducting material in those portions, which are necessary for the production of the electrostatic acceleration field. The linings 13 may, for example, be produced by inserting into the apertures 8 bushings of electrically conducting material and by interconnecting these bushings by a conductor network which may, for example, be produced by a vapor deposition or the like or by printed circuit techniques.

The above mentioned spacing "*d*" between the lower end of the winding 4 and the cathode 7 is so selected that the bending of the field lines of the alternating field in the area of the plasma boundary is substantially equivalent to a completely undisturbed field line distribution. Stated differently, the field lines in the ion engine according to the invention extend substantially vertically relative to the plane of the plasma boundary anchor 5. It has been found that a spacing "*d*" between the end of the field winding 4 facing the cathode 7 and the cathode 7 should correspond to at least 10% of the length of the field winding 4. However, it will be appreciated that the spacing "*d*" between the cathode and the lower end of the field winding 4 may be smaller where the effect of the cathode on the field line distribution is also smaller.

The spacing between the cathode 7 and the plasma boundary anchor 5 influences the diversions of the ion beam and the cathode leakage current is to be determined with due regard to the respective desired values.

It has been found to be advantageous for the field line distribution of the alternating electromagnetic field 10 to surround this field by the metal housing 14, as mentioned above. The housing should be properly spaced from the field winding 4. This feature is especially advantageous where the field winding 4 is relatively short compared to its diameter.

Although the invention has been described with reference to specific example embodiments, it is to be understood, that it is intended to cover all modifications and equivalents within the scope of the appended claims.

What is claimed is:

1. An ion engine comprising an ionization chamber, anchor means with apertures therein for providing a plasma boundary in said ionization chamber, high frequency winding means surrounding said ionization chamber for generating a high frequency alternating electromagnetic field in said ionization chamber to ionize a gas in said ionization chamber, anode means arranged in said chamber, cathode means with apertures therein also arranged in said chamber to form an anode-cathode path for accelerating the ionized gas through said apertures in said plasma boundary anchor means and in said cathode out of said ionization chamber, said high frequency winding means being arranged in such a position above said cathode means as to maintain the field lines of said high frequency alternating electromagnetic field substantially undisturbed in the area adjacent to said plasma boundary anchor means, and to keep said field lines substantially at a right angle relative to the surface of said plasma boundary anchor means facing into said ionization chamber.

2. The ion engine of claim 1, wherein said cathode has a thickness which is proportional at least to the penetration depth "*s*" of said high frequency alternating electromagnetic field into said cathode, said depth "*s*" being determined by the formula $$s = 1/(\pi f\, \mu_o \mu_r \kappa),$$

wherein $\pi = 3.14$; $f$ = frequency of said electromagnetic field in Hz; $\mu_o = 1.256$ ($\mu$H/m) = absolute permeability; $\mu_r$ = relative permeability and $\kappa$ = specific permeability (S m/mm$^2$) of the cathode mterial.

3. The ion engine of claim 1, wherein said cathode is made of graphite.

4. The ion engine of claim 1, wherein said cathode is made of an insulating material, electrically conductive material covering the walls of said apertures in said cathode, and electrically conducting means operatively interconnecting said wall covering material in said apertures.

5. The ion engine of claim 1, further comprising a spacing between the cathode and the end of said high frequency winding means facing said cathode.

6. The ion engine of claim 5, wherein said high frequency winding means has a given length and wherein said spacing corresponds to at least 10% of said given length.

7. The ion engine of claim 1, further comprising metal housing means surrounding said high frequency winding means.

* * * * *